United States Patent
Choi et al.

(10) Patent No.: US 9,613,060 B2
(45) Date of Patent: Apr. 4, 2017

(54) LOCATION-BASED SERVICE METHOD AND SYSTEM USING LOCATION DATA INCLUDED IN IMAGE DATA

(75) Inventors: Jin-Seung Choi, Seoul (KR); Jae-Chul Lim, Seoul (KR); Jae-Bum Park, Seoul (KR); Hong-Keun Ji, Seoul (KR); Jong-Ho Kim, Seoul (KR); Do-Wan Kim, Seoul (KR); Hyun-Jun Oh, Seoul (KR); Dong-Won Na, Seongnam-si (KR); Won-Hee Sull, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 2200 days.

(21) Appl. No.: 11/911,879

(22) PCT Filed: Apr. 19, 2006

(86) PCT No.: PCT/KR2006/001444
§ 371 (c)(1),
(2), (4) Date: Mar. 27, 2008

(87) PCT Pub. No.: WO2006/112656
PCT Pub. Date: Oct. 26, 2006

(65) Prior Publication Data
US 2008/0171558 A1    Jul. 17, 2008

(30) Foreign Application Priority Data
Apr. 19, 2005    (KR) .......................... 10-2005-0032452

(51) Int. Cl.
*H04W 24/00* (2009.01)
*G06F 17/30* (2006.01)
(52) U.S. Cl.
CPC .............................. *G06F 17/30265* (2013.01)

(58) Field of Classification Search
CPC .................................................. G06F 17/30265
(Continued)

(56) References Cited

U.S. PATENT DOCUMENTS 6,023,241 A * 2/2000 Clapper ................... 342/357.32
6,199,014 B1 * 3/2001 Walker et al. ................ 701/211
(Continued)

FOREIGN PATENT DOCUMENTS

JP    06-261244    9/1994
JP    2000-235580    8/2000

OTHER PUBLICATIONS

Korea Office Action for application No. 10-2005-0032452.
International Search Report for application No. PCT/KR2006/001444.

*Primary Examiner* — Andrew Sasinowski
*Assistant Examiner* — Kuo Woo
(74) *Attorney, Agent, or Firm* — Hauptman Ham, LLP (57) ABSTRACT

The present invention relates to a location-based service method and system using location data included in image data, particularly to a method and a system of providing the location-based service with photos taken by a camera phone, using location information at the shooting time. The location-based service method according to the present invention, using the image data provided using a terminal equipped with a camera and the location data including the location information of the terminal, comprises the steps of shooting a target image with the terminal at a predetermined location and generating first image data; receiving the location data; including the received location data in the first image data and generating second image data; and displaying an image corresponding to the first image data and providing a service using the location data, if the second image data are selected.

23 Claims, 5 Drawing Sheets

(58) Field of Classification Search
USPC ............... 455/456, 456.2; 701/211; 358/302; 345/638; 342/357.2; 340/539.13; 348/207.2
See application file for complete search history.

(56) References Cited

U.S. PATENT DOCUMENTS

| | | | |
|---|---|---|---|
| 6,437,797 B1* | 8/2002 | Ota ................................. | 345/638 |
| 2002/0049064 A1* | 4/2002 | Banno ............................ | 455/456 |
| 2002/0101619 A1* | 8/2002 | Tsubaki et al. ............... | 358/302 |
| 2002/0135680 A1* | 9/2002 | Haruki ......................... | 348/207.2 |
| 2004/0229656 A1* | 11/2004 | Takahashi et al. ........... | 455/566 |
| 2006/0077055 A1* | 4/2006 | Basir ............................ | 340/539.13 |

* cited by examiner

LOCATION-BASED SERVICE METHOD AND SYSTEM USING LOCATION DATA INCLUDED IN IMAGE DATA

CROSS REFERENCE TO RELATED APPLICATION

This application is the National Phase application of International Application No. PCT/KR2006/001444, filed Apr. 19, 2006, which designates the United States and was published in English. This application, in its entirety, is incorporated herein by reference.

TECHNICAL FIELD

The present invention relates to a method and a system of providing various services using photos taken by a camera phone, particularly to a method and a system of providing various services, including location information at the shooting time, with the photos taken by the camera phone.

BACKGROUND ART

Recently, as electronic parts become high sensitive, smaller and lighter, a mobile communication terminal is getting more downsized, and the function of the mobile communication terminal is getting various according to the needs of consumers. In addition to a calling function of the mobile communication terminal, a game function, an Internet retrieving function, an e-mail receiving and transmitting function, payment-settling function, etc. become generalized. In addition, the mobile communication terminal (camera phone), additionally having a camera function shooting a shape of an object with an equipped camera lens and an image transmitting function transmitting the shape of the object shot by the camera to computers or others' mobile communication terminals, becomes commercialized.

However, since the shot photo has only image information, the conventional camera phone is limited to play a role of showing a user the image information or showing others only the shot photo by transmitting the image information to their mobile communication terminals or computers.

DISCLOSURE OF INVENTION

Technical Solution

The present invention is provided to overcome the foregoing stated limit which the conventional camera phone contains. The object of the present invention is to provide a service of showing the user the shot location by map or guiding the user to the location when the user or others view the shot photo through the terminal, by including station information of the shot location or global positioning information of a GPS terminal in the image information at the time of shooting the photo with the camera phone.

According to the present invention, by using a method of inserting and storing the location information at the shooting time on the photo shot by the terminal equipped with the camera, it is possible to provide various location-based services using the shot location information as well as view the corresponding photo.

The location-based service using the location information included in photo information enables the user who views the photo to obtain the geographical location information by providing map information on the shot location, and enables the user to get to the location as quickly as possible when the location in the photo catches the fancy of the user by providing a service of guiding the user to the location in conjunction with a navigation system.

The location-based service method, according to the present invention, using image data provided through a terminal equipped with a camera and location data including location information of the terminal, comprises the steps of: shooting a target image with the terminal at a predetermined location and generating first image data; receiving the location data; including the received location data in the first image data and generating second image data; and displaying an image corresponding to the first image data and providing a service using the location data, if the second image data are selected.

Selectively, the terminal comprises a camera phone or a digital camera which can receive the location data.

The terminal according to the present invention, which is equipped with the camera and can receive the location data, comprises a camera section shooting the image at the predetermined location and generating the first image data; a location data processing section including the location data of the terminal in the first image data and generating the second image data; and an image data storing section receiving and storing the second image data.

The location-based service system including the terminal according to the present invention comprises a location data providing system providing the location data of the terminal and a service system providing a service based on the location data according to the user's selection.

BEST MODE FOR CARRYING OUT THE INVENTION

The details and the improved matters of the present invention are disclosed in dependent claims.

Hereunder, with reference to the attached drawings, a preferred embodiment of the present invention is explained in detail.

Figure 1:
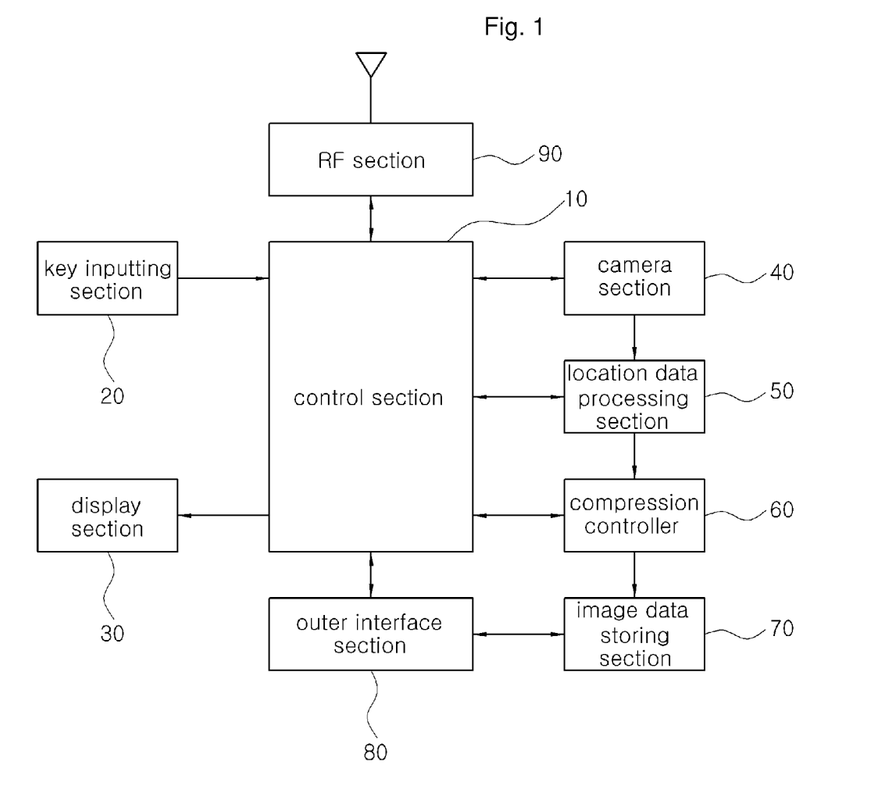
FIG. 1 is an outlined diagram showing a terminal having a photo shooting function and a location information processing function according to one preferred embodiment of the present invention.

FIG. 1 illustrates a constitution view of the terminal having the shooting function and the location information processing function according to one preferred embodiment of the present invention.

Referring to FIG. 1, the terminal comprises a control section (10), a key inputting section (20), a display section (30), a camera section (40), a location data processing section (50), a compression controller (60), an image data storing section (70), an outer interface section (80) and a RF section (90).

Selectively, the terminal can comprise a digital camera supported by a satellite receiving module.

The control section (10) controls the receiving and transmitting of a radio frequency signal through the RF section (90), and controls the photo shooting and the output of the shot image data. The key inputting section (20) receives the user's instructions for the photo shooting and the output of the shot image data, and transmits the same to the control section (10). The display section (30) displays the contents related to the photo shooting which are transmitted from the control section (10) and informs the user of the same, and displays the image data transmitted from the control section (10).

The camera section (40) shoots an object through a camera lens according to the control of the control section (10), converts the image of the shot object into a digital signal, captures consecutive digital signals as still pictures, and generates the first image data. Herein, the control section (10) controls the shooting function of the camera section (40) according to the user's instructions through the key inputting section (20). Subsequently, the camera section (40) provides the image data to the location information processing section (50).

The location information processing section (50) includes the location data received from a location information providing means (not illustrated) in the first image data generated in the camera section (40). The location information providing means can be a GPS means using a satellite or CPS means using a base station information.

The means using the base station information, by means of CPS (Cell Positioning System), retrieves a particular cell in which a corresponding private mobile terminal is located and obtains the location information of the private mobile terminal. As noted, a person skilled in the art sectionalizes a service region into predetermined cells in order to provide a mobile communication service of a cellular or a PCS, and provides each cell with at least one base station. The private mobile terminal positioned in one cell performs a predetermined communication with the base station, thereby performing the processes of synchronization and paging, etc. with the base station. The location information of the private mobile terminal which is obtained by the paging with the base station is recorded in a home location registry (HLR), and, using the location information of the private mobile terminal recorded in HLR, performs a method of providing the service using the location information of the private mobile terminal according to the following present invention.

The terminal using the GPS (Global Positioning System) means which utilize a satellite receives the location data of the current altitude, direction, etc. through a GPS antenna contained in the terminal from the satellite floating over the earth.

The compression controller (60), according to the control of the control section (10), receives the first image data output from the location data processing section (50) and the second image data including the location data, compresses and stores the same in the image data storing section (70). The outer interface (80) is connected to the computer, etc. so that the image data stored in the image data storing section (70) can be displayed.

Figure 2:
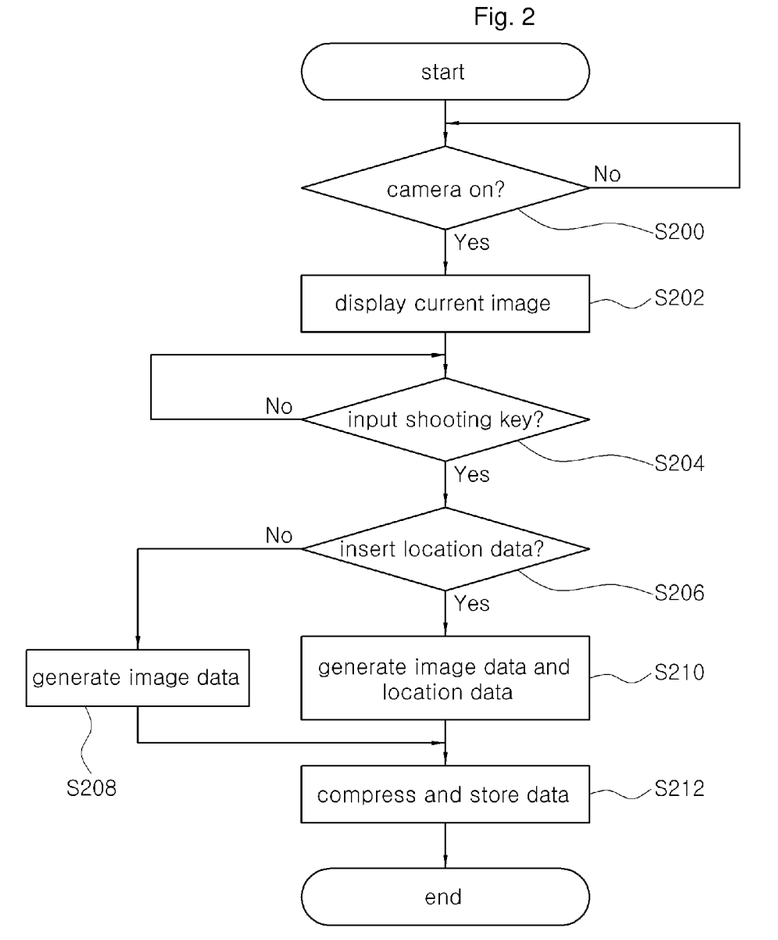
FIG. 2 is a flow chart showing a method of storing first image data and second image data including location data according to another preferred embodiment of the present invention.

FIG. 2 illustrates a flowchart of the method of storing the first image data and the second image data including the location data according to another preferred embodiment of the present invention.

Referring to FIG. 2, the first thing is to check whether or not a camera shooting mode is set to "on" (S200). If the camera shooting mode is set to "on", the current image of the location which the user wants to shoot is displayed on the display section (S202). Subsequently, if the user input a photo shooting key (S204), the current image is shot, and a menu inquiring about whether to insert the location data is displayed (S206). In addition, selectively, the step (S206) can be performed after the first image data are generated and stored. If the user does not want to insert the location data into the shot image data, the shot first image data are generated and transmitted to the compression controller, and the compression controller compresses and stores the first image data on the image data storing section (S208). If the user chooses to insert the location data, the location data processing section inserts the location data into the shot first image data and generates the second image data (S210). As in the step (S208), the compression controller compresses and stores the first image data and the second image data including the location data on the image data storing section (S212).

The stored second image data can be transmitted to another mobile terminal through a wireless network, and the mobile terminal includes a PCS phone, a cellular phone, a PDA phone, etc. In addition, the data can be transmitted to a fixed terminal through an outer interface, and can be uploaded on a web page through an Internet network.

Figure 3:
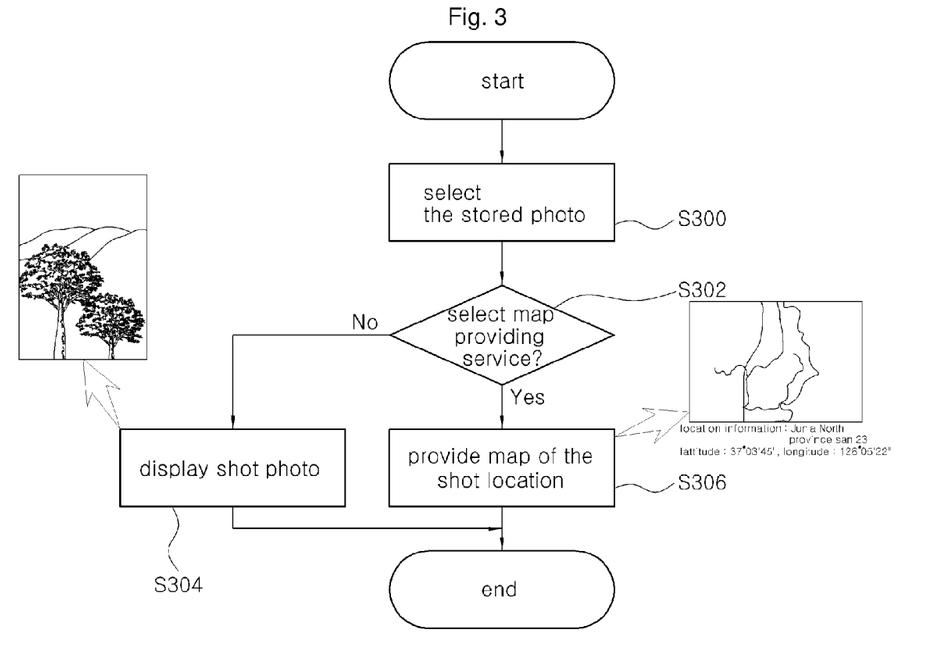
FIG. 3 is a flow chart showing a method of providing a map of the shot location to the user as a location-based service using the first image data and the second image data including the location data according to another preferred embodiment of the present invention.
Figure 4:
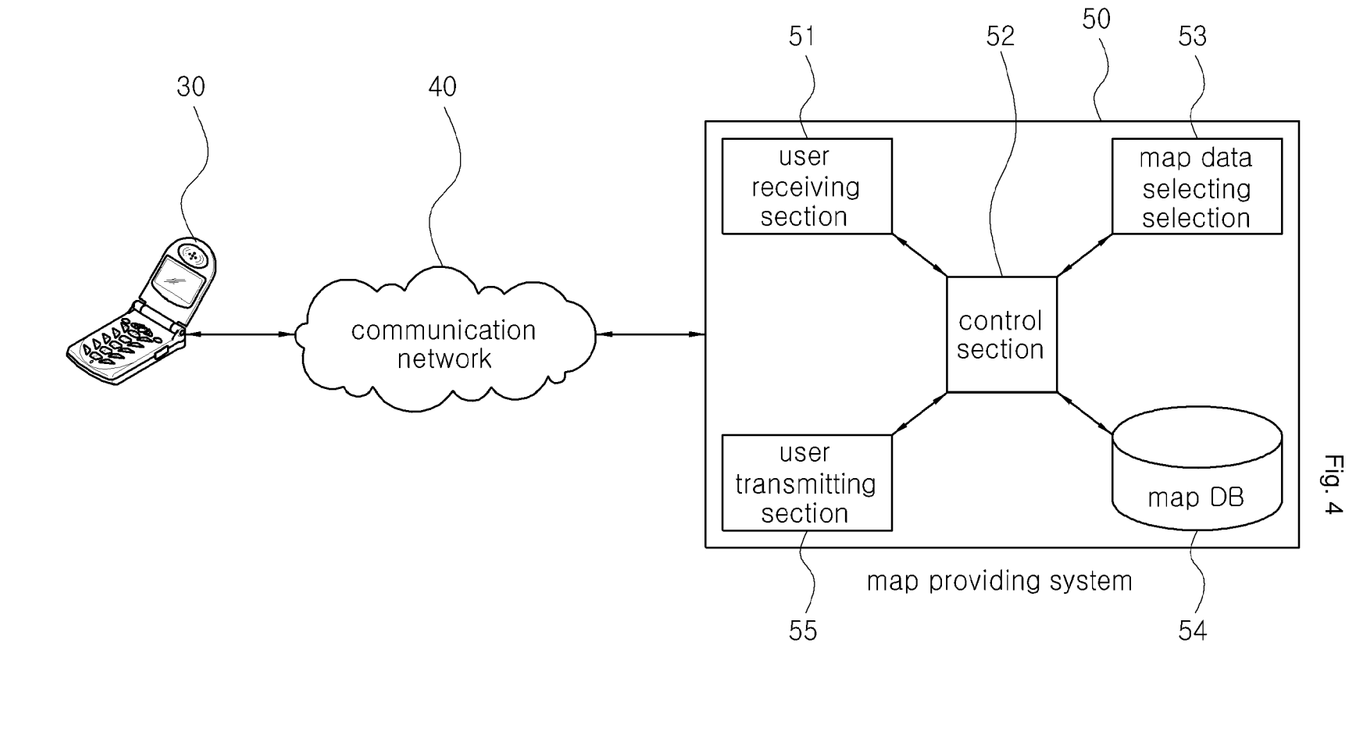
FIG. 4 is an outlined diagram showing a system of providing a map of the shot location to the user as the location-based service using the first image data and the second image data including the location data according to another preferred embodiment of the present invention.

FIGS. 3 and 4 illustrate a method and a system of providing the map of the location where the user shoots the photo in the terminal using the location data included in the second image data.

Referring to FIG. 3, the first thing is for the user to select the stored photo in the terminal (S300). Herein, the stored photo includes the shot first image data and the location data of the terminal corresponding to the shot location. Subsequently, a menu inquiring about whether to select a map providing service is displayed (S302), and if the user does not want the map of the shot location, only the shot photo is displayed on the display section (S304). If the user selects the map providing service (S306), the map of the shot location is provided by a map data providing server and the map is displayed by a map providing section contained in the terminal. Selectively, after the step (S306), a step of selecting a type of the map, or a step of selecting a scale, etc. can be additionally included. In the map, the traffic information, the geographical information, etc. of the shot location can be included, and the latitude, the longitude, and the administrative district address of the shot location can be displayed.

Referring to FIG. 4, the system of providing the map of the location where the user shoots the photo in the terminal using the location data included in the image data according to one preferred embodiment of the present invention, comprises a terminal (30) containing a map providing section; a communication network (40); and a map providing system (50) consisting of a user receiving section (51), a control section (52), a map data selecting section (53), a map DB (54) and a user transmitting section (55).

The map DB (54) maintains a map corresponding to the location data which the terminal of the user provides. The control section (52) controls the function within the map providing system (50). The user receiving section (51) receives a request of the map data related to optional location data through the communication network (40) from the terminal (30). In response to the input of the request, the map data selecting section (53) selects any one of the map data maintained in the map DB (54) according to a predetermined standard. The user transmitting section (53) transmits the selected map datum to the terminal (30).

Figure 5:
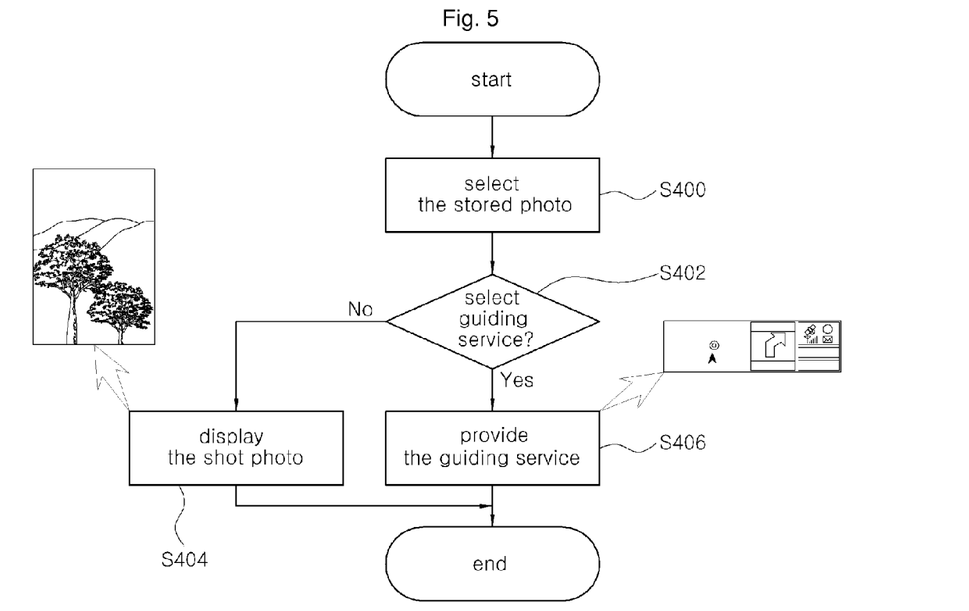
FIG. 5 is a flow chart showing a method of providing a service of guiding the user to the shot location as the location-based service using the first image data and the second image data including the location data according to another preferred embodiment of the present invention.
Figure 6:
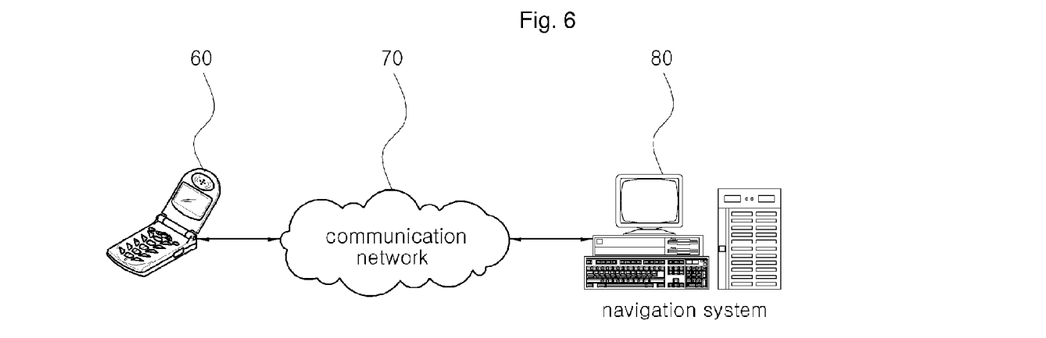
FIG. 6 is a flow chart showing a system of providing a service of guiding the user to the shot location as the location-based service using the first image data and the second image data including the location data according to another preferred embodiment of the present invention.

FIGS. 5 and 6 illustrate a method and a system of providing a guiding service in conjunction with a navigation system using the first image data and the second image data including the location data according to another preferred embodiment of the present invention.

Referring to FIG. 5, the first thing is for the user to select the stored photo in the terminal (S400). Herein, the stored photo was stored as the shot first image data and the location data of the terminal corresponding to the shot location. Subsequently, a menu inquiring about whether to select the guiding service is displayed (S402), and if the user does not want the guiding service to the shot location, only the shot photo is displayed on the display section (S404). If the user selects the guiding service, the navigation data corresponding to the location data of the shot location are transmitted to the terminal by the navigation system, and the guiding service by means of a navigator of the terminal, including the shortest route to the shot location, the traffic condition, etc., is displayed on the display section (S406).

Referring to FIG. 6, the system of providing the service of guiding the user to the shot location using the first image data and the location data of the terminal according to another preferred embodiment of the present invention comprises a terminal (60) equipped with a navigator, a communication network (70) and a navigation system (80).

The terminal (60) transmits the location data (shot location) of the terminal to the communication network (70) on the service request, and the communication network transmits the location data including the location data of the current terminal to the navigation system (80). The navigation system (80) can comprise a map information section, a GIS (Geography Information System) section, a transmitting and receiving section, an operating section, a control section, etc. (not illustrated), and generates navigation data based on the location data of the terminal, transmits the same to the terminal (60) through the communication network (70). The navigator (not illustrated) of the terminal (60) receives and displays the navigation information on the display section.

The guiding service can be provided to the user using the terminal at the time of moving a vehicle or walking.

Although the present invention has been described in accordance with the preferred embodiments, the embodiments are merely illustrative, and are not limited to the scope of the present invention.

It is understood by those skilled in the art that various changes or modifications may be made in the above embodiments of the present invention without departing from the spirit and scope of the invention. Thus, all the modifications and changes from the claims and their equivalents will be interpreted to be included within the present invention.

The invention claimed is:

1. A location-based service method using image data provided by a terminal equipped with a camera, and using location data that includes location information of the terminal, comprising:

generating first image data with the terminal at a predetermined location;

receiving location data of the predetermined location;

prompting a user to choose whether or not to insert the received location data into the first image data to generate a second image data and, when the user chooses to do so, inserting the received location data into the first image data to generate a second image data;

transmitting the second image data, the second image data including the first image data and the location data, to another terminal;

receiving, at the another terminal, a selection input for an image corresponding to the second image data, from the user;

displaying, at the another terminal, an image corresponding to the first image data, and a menu inquiring about whether to select a location-based service;

receiving, at the another terminal, via the displayed menu, a selection input for the location-based service, from the user;

receiving, at the another terminal, location-based service data corresponding to the location data of the selected second image data; and providing the location-based service to the another terminal by using the received location-based service data.

2. The location-based service method according to claim 1, the method further comprising:

compressing and storing the second image data, after the prompting.

3. The location-based service method according to claim 1, wherein the map includes at least one of geographical information, traffic information, administrative district information, and information including the latitude and the longitude of the location data.

4. The location-based service method according to claim 1, wherein the location-based service is a guiding service, wherein the receiving the selection input comprises transmitting a service request signal and the location data to a navigation system;

wherein the navigation system provides a navigation data corresponding to the location data, as the location-based service data, and wherein the providing the location-based service comprises providing the guiding service by means of a navigator of the another terminal, which is displayed on a display section of the another terminal.

5. The location-based service method according to claim 4, wherein the location data comprises current location data of the terminal.

6. The location-based service method according to claim 4, wherein the navigation data comprises at least one of the information including the shortest route corresponding to the location data, traffic information and turnaround time.

7. The location-based service method according to claim 1, wherein the location data are provided by a location data providing system.

8. The location-based service method according to claim 7, wherein the location data providing system is configured to provide the location data of the terminal using a Cell Positioning System (CPS).

9. The location-based service method according to claim 7, wherein the location data providing system is configured to provide the location data of the terminal using a Global Positioning System (GPS).

10. The location-based service method according to claim 1, wherein the location data includes information on latitude and longitude of the terminal or base station.

11. The location-based service method according to claim 1, wherein the terminal equipped with the camera includes a camera phone or a digital camera.

12. The location-based service method according to claim 11, wherein the digital camera includes a module for receiving the location data.

13. A location-based service method using image data provided by a terminal equipped with a camera, and using location data that includes location information of the terminal, comprising:
   generating first image data with the terminal at a predetermined location;
   receiving location data of the predetermined location;
   prompting a user to choose whether or not to insert the received location data into the first image data to generate a second image data and, when the user chooses to do so, inserting the received location data into the first image data to generate a second image data;
   transmitting the second image data, the second image data including the first image data and the location data, to another terminal;
   receiving, at the another terminal, a selection input for an image corresponding to the second image data, from the user;
   displaying, at the another terminal, an image corresponding to the first image data, and a menu inquiring about whether to select a location-based service;
   receiving, at the another terminal, via the displayed menu, a selection input for the location-based service, from the user;
   receiving, at the another terminal, location-based service data corresponding to the location data of the selected second image data; and
   providing the location-based service to the another terminal by using the received location-based service data.

14. The location-based service method according to claim 13,
   wherein the location-based service is a guiding service, and
   wherein the receiving the selection input comprises transmitting a service request signal and the location data to a navigation system,
   wherein the navigation system provides a navigation data corresponding to the location data, as the location-based service data, and
   wherein the providing the location-based service comprises providing the guiding service by means of a navigator of the another terminal, which is displayed on a display section of the another terminal.

15. A terminal, the terminal configured to receive location data, comprising:
   a camera section for generating a first image data at a predetermined location;
   a location data processing section for prompting a user to choose whether or not to insert the location data into the first image data to generate a second image data and, when the user chooses to do so, inserting the location data into the first image data to generate a second image data; and
   an image data storing section for receiving and storing the second image data;
   a transmitting section for transmitting the second image data, the second image data including the first image data and the location data, to another terminal; and
   a compression controller for compressing the second image data and transmitting the second image data to the image data storing section,
   wherein the another terminal is configured to
      receive a selection input for an image corresponding to the second image data, from the user,
      display an image corresponding to the first image data, and a menu inquiring about whether to select a location-based service,
      receive, via the displayed menu, a selection input for the location-based service, from the user,
      receive location-based service data corresponding to the location data of the selected second image data, and
      providing the location-based service by using the received location-based service data.

16. The terminal according to claim 15, wherein the camera section is configured to receive the location data.

17. The terminal according to claim 15, wherein the location data is provided by a location data providing system using a base station or a satellite.

18. The terminal according to claim 17, wherein the location data providing system is configured to provide the location data through a Cell Positioning System (CPS).

19. The terminal according to claim 17, wherein the location data providing system is configured to provide the location data through a Global Positioning System (GPS).

20. The terminal according to claim 19, further comprising a GPS antenna for receiving the location data from the location data providing system.

21. The terminal according to claim 19, further comprising:
   a service system for providing a service according to a user's selection based on the location data.

22. The terminal according to claim 21, wherein the service system is a map providing system or a navigation system.

23. The terminal according to claim 15,
   wherein the location-based service is a guiding service, and
   wherein the another terminal is further configured to, when the selection input is received, transmit a service request signal and the location data to a navigation system,
   wherein the navigation system provides a navigation data corresponding to the location data, as the location-based service data, and
   wherein the another terminal is further configured to provide the guiding service by means of a navigator of the another terminal, which is displayed on a display section of the another terminal.

* * * * *